United States Patent [19]
Bolte

[11] 3,943,840
[45] Mar. 16, 1976

[54] POCKET BUN BAKING DEVICE

[76] Inventor: Brown Bolte, 1184 Lake House Court, N. Palm Beach, Fla. 33408

[22] Filed: June 13, 1974

[21] Appl. No.: 476,341

[52] U.S. Cl. .................. 99/428; 99/383; 99/384
[51] Int. Cl.² .......................................... A21B 3/13
[58] Field of Search ................ 99/428, 379–380, 99/381–382, 383–384, 426–427, 441, 448–449, 450; 425/289; 249/123–124, 129–130; 312/183, 293; 248/106, 181, 223

[56] References Cited
UNITED STATES PATENTS

| | | | |
|---|---|---|---|
| 1,139,037 | 5/1915 | Huth | 99/428 X |
| 1,674,033 | 6/1928 | Carpenter | 99/383 |
| 1,882,363 | 10/1932 | Keyting | 99/381 |
| 2,048,212 | 7/1936 | Goulooze | 99/450 UX |
| 2,168,006 | 8/1939 | Strietelmeier | 99/383 X |
| 2,252,990 | 8/1941 | Smith | 99/428 UX |
| 2,640,600 | 6/1953 | Farr | 211/106 |
| 3,158,087 | 11/1964 | Hedglin | 99/428 |
| 3,322,060 | 5/1967 | Gilbert | 99/450 X |

Primary Examiner—Daniel Blum
Assistant Examiner—Arthur O. Henderson

[57] ABSTRACT

A pocket bun baking device including a pan, a female die means, and die supporting means connected to the female die means and to the pan. The female die means includes a plurality of pocket dies and bun divider plates. The die supporting means are rods connected to the top of each pocket die and divider plate. Both ends of each rod are movably connected to the top edge of the pan with the female die means positioned in the pan. The rod ends are movable to unlock the female die means in order that the female die means can be moved upwardly out of the pan.

3 Claims, 4 Drawing Figures

POCKET BUN BAKING DEVICE

BACKGROUND OF THE INVENTION

This invention relates to a new and improved pocket bun bakery pan and, more particularly, to a pan movably connected to a plurality of pocket bun dies that are positionable in and out of the pan.

In the past, buns such as hotdog buns have been designed with preformed pockets therein. Such preformed pocket buns have been manufactured by cutting and removing a pocket portion from the bun prior to wrapping the buns. Such design features are shown in U.S. Design Pat., Ser. No. 205126. Various other methods of manufacturing pocket buns are shown to be old in the U.S. Pat., Ser. No. 2330410. The prior art shows that the methods of manufacturing pocket buns is both cumbersome and costly.

BRIEF DESCRIPTION OF THE INVENTION

This present invention relates to a pocket bun baking device and method of manufacturing pocket buns. The pocket bun baking device includes a pan of shallow depth having a depth equal to the height of the buns to be manufactured. The pan is connected to a mounted means having distal ends movable from a working position to an unlocked position to allow the arms to be moved upwardly from the pan. Projecting downwardly from the rod means are a plurality of pocket bun dies each of which is in the shape of rectangular box or container with a closed bottom and rounded edges. Between each pocket bun die is a downwardly projecting bun divider plate. When the dough is placed in the pan the ends of the rod means are held in a generally horizontal position above the pan. After the dough is placed in the bottom of the pan the rod means and the downwardly projecting pocket dies and bun divider plates are forced downwardly into the dough into a generally horizontal working position. A portion of the dough is moved upwardly into the spaces between each divider plate and each pocket die. Thereafter the dough rises further upwardly between each pocket die and divider plate to automatically form a pocket in each bun and to provide a separation breaking area between each pocket in each bun. Thereafter, the rods, pocket dies and bun divider plates may be removed directly upwardly after unlocking the rod ends. The distal ends of rods and flange members on the pan provide a locking device.

It is an object of this invention to provide a new and improved pocket bun pan device.

It is a further object of this invention to provide a non-complex pocket bun pan device and method of manufacturing pocket buns in an economical manner.

A further oject of this invention is to provide pocket buns that are easily separated from one another without cutting the bun.

In accordance with these and other objects which will be apparent hereinafter, the instant invention will now be described with particular references to the accompanying drawings.

DESCRIPTION OF A PREFERRED EMBODIMENT

Figure 1:
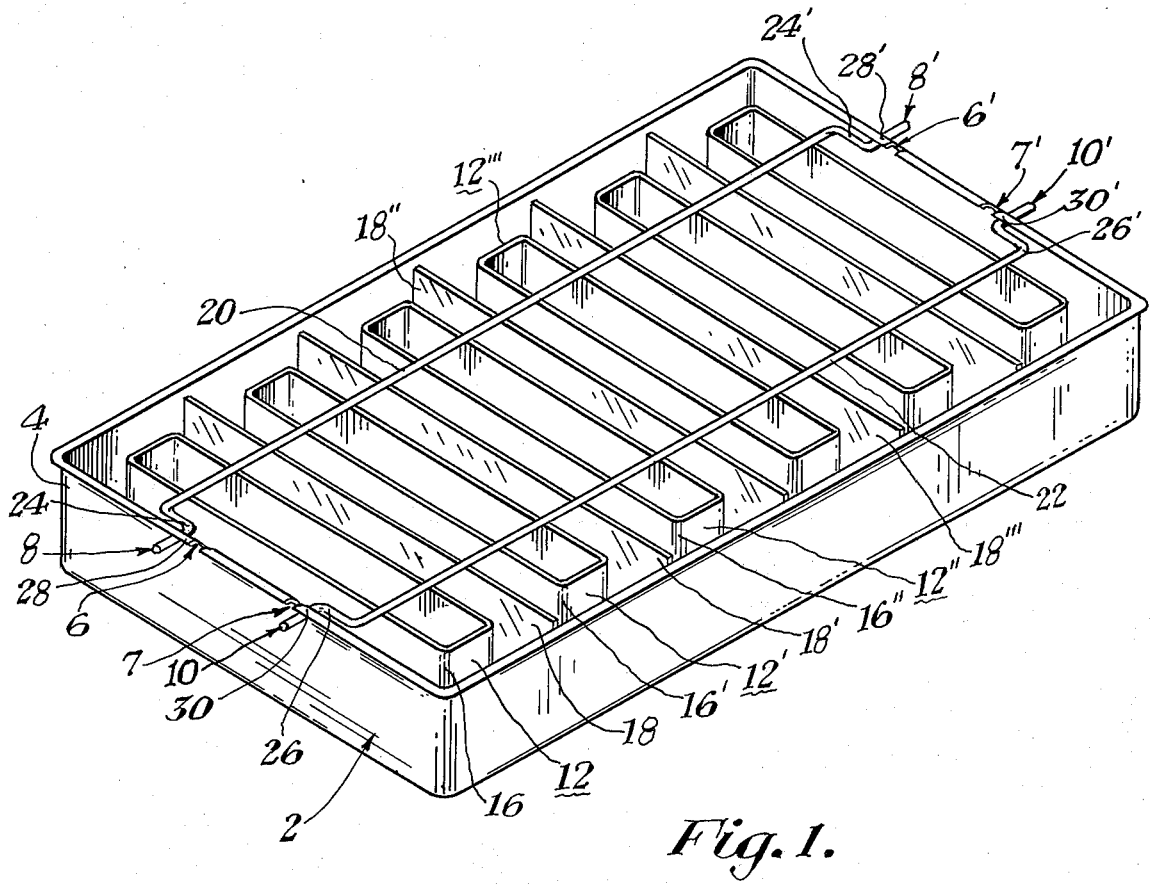
FIG. 1 is an isometric view of the pocket bun baking device.
Figure 2:
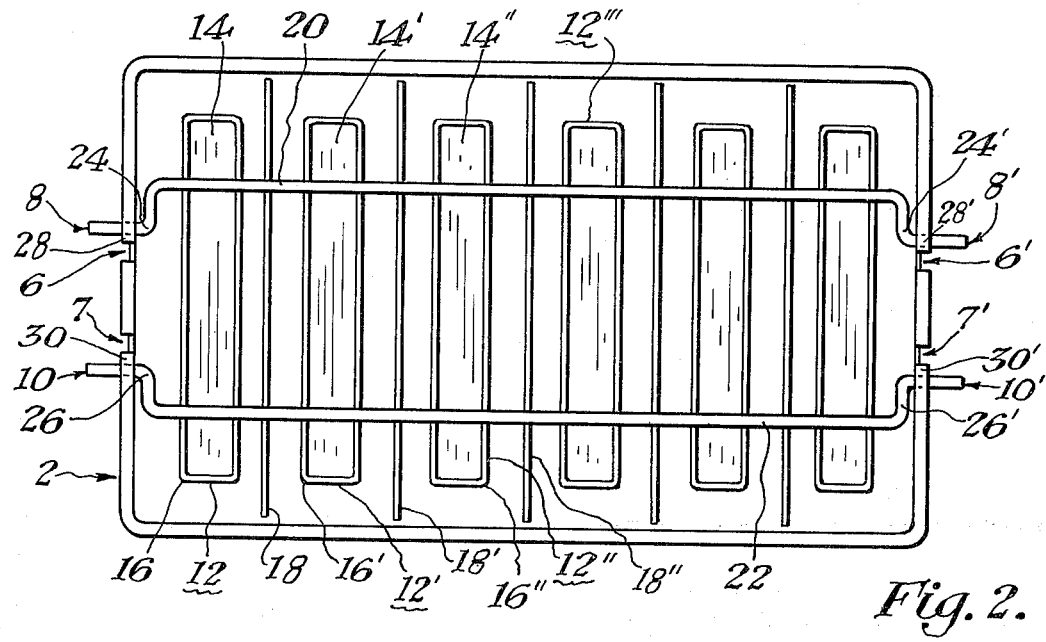
FIG. 2 is a top view of the pocket bun baking device.
Figure 3:
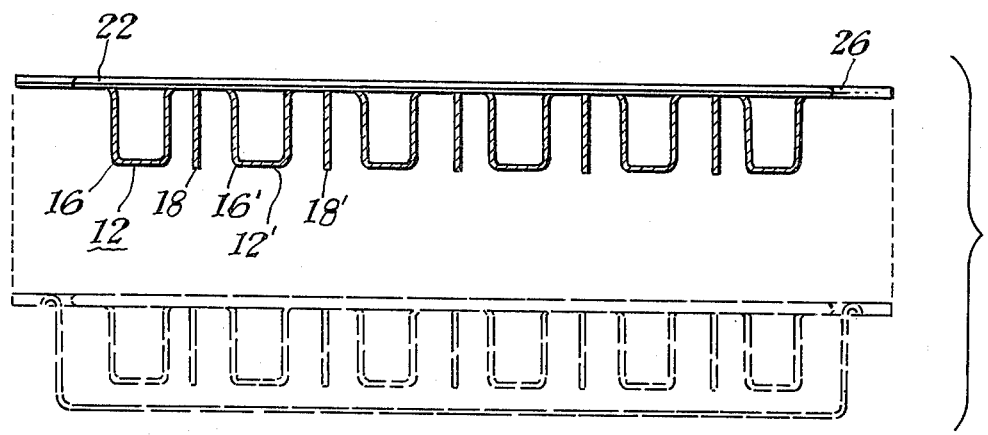
FIG. 3 is a side view of the pocket bun baking device.
Figure 4:
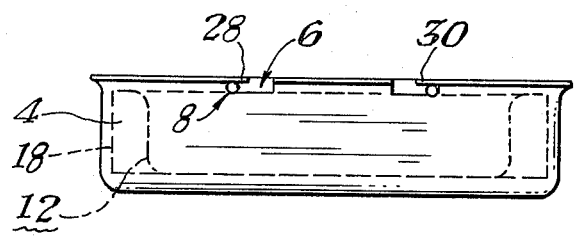
FIG. 4 is an end view of the pocket bun baking device.

Referring now to the drawings, the pocket bun baking device, generally referred to as number 2 includes a pan of 4 of shallow depth having the depth equal to the height of the buns to be manufactured by the improved method. The pan 4 is connected at 6 and 6' to rod means 8 having a distal end 8'. The second rod means 10 having distal end 10' is connected at 7 and 7' to pan 4. The rods means are movable from a working position as shown in FIG. 1 to an upper position as shown in FIG. 3. Projecting downwardly from the rod means 8 and 10 are a plurality of pocket bun dies such as 12, 12', 12'', and 12''', etc., each of which are in the shape of rectangular box or containers with a closed bottom such as 14, 14', 14'', etc. with rounded edges such as 16, 16', 16'', etc. Between each pocket bun die 12, 12', 12'', etc. is a downwardly projecting bun divider plates 18, 18', 18'', etc.

The rod means 8 and 10 includes rod 20 and 22 with connected portions 24 and 24' and 26 and 26' at the proximal ends of the rods. The pan 2 has flange members 28 and 28' and 30 and 30' that surround a portion of the connecting portions 24 and 24' and 26 and 26' to connect the rod means 8 and 8' to the pan. The distal ends 24, 24', 26 and 26' of the rods 20 and 22 and the flange members 28, 28', 30 and 30' over notches 6 and 7 on the pan 2 provide a locking device for the pan and rods.

When the dough is placed in the bottom of the pan 2, the rod means 8 and 10 and the downwardly projecting pocket dies 12, 12', etc. and bun divider plates 18 and 18', etc. are forced downwardly into the dough into a generally horizontal position. A portion of the dough is moved upwardly into the spaces between each divider plate and each pocket die. The dough then rises upwardly into the spaces between each divider plate and each pocket die. Thereafter, the dough rises further upwardly between each pocket die such as 12, 12', etc. and divider plate such as 18, 18', etc. to automatically form a pocket in each bun and to provide a separation breaking area between each pocket in each bun. Upon completion of the baking process the rods, dies and dividers are removed as shown in FIG. 3.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A pocket bun device comprising:

a pan, having a fixed bottom and sides with an open top, a die holding means removably mounted to opposite sides of said pan for vertical movement out of said pan, a plurality of generally open rectangular box-shaped pocket bun dies projected downwardly from and rigidly connected to said die holding means, said dies having a bottom member positioned generally parallel to said bottom of said pan in a mounted position and during removal, and a plurality of bun divider means projecting downwardly from and connected to said die holding means, and divider means are positioned between all said pocket bun dies.

2. A pocket bun device as set forth in claim 1 wherein said die holding means is movable to fully open the top of said pan to allow the pan to be filled and movable into a mounted working position covering the pan to provide pocket-divided buns.

3. A pocket bun device as set forth in claim 2 wherein said pan includes a locking means to removably fix said die holding means to said pan.

\* \* \* \* \*